UNITED STATES PATENT [19]

[11] 4,228,530
[45] Oct. 14, 1980

Bergey

[54] MUD LEVEL MONITOR

[76] Inventor: Taylor G. Bergey, 4306 Tonawanda, Houston, Tex. 77035

[21] Appl. No.: 907,548

[22] Filed: May 19, 1978

[51] Int. Cl.$^2$ ............................................. G01S 9/68
[52] U.S. Cl. .................................. 367/112; 367/115; 367/908; 73/290 V; 181/400; 175/40
[58] Field of Search ............ 340/1 L, 1 C; 73/290 V, 73/155; 181/123, 124, 139, 140, 142, 400; 175/40, 48, 38; 367/107, 108, 112, 113, 115, 908

[56] References Cited

U.S. PATENT DOCUMENTS

| | | | |
|---|---|---|---|
| 2,659,046 | 11/1953 | Arps | 175/40 |
| 2,914,686 | 11/1959 | Clements et al. | 310/9.1 |
| 2,927,301 | 3/1960 | Booth et al. | 340/18 |
| 2,943,296 | 6/1960 | Fryklund | 340/1 L |
| 3,100,023 | 8/1963 | Clements | 181/0.5 |
| 3,184,969 | 5/1965 | Bolton | 340/1 L X |
| 3,316,997 | 5/1967 | McCoy | 181/124 X |
| 3,726,136 | 4/1973 | McKean et al. | 73/155 |
| 3,757,285 | 9/1973 | Ferré | 340/1 C |
| 3,821,726 | 6/1974 | Chang | 73/155 X |
| 3,915,256 | 10/1975 | McCoy | 181/124 X |
| 4,000,650 | 1/1977 | Snyder | 73/290 V |
| 4,090,407 | 5/1978 | Shuler et al. | 73/290 V |
| 4,101,865 | 7/1978 | Schurr | 340/1 L |
| 4,114,441 | 9/1978 | Magri | 73/290 V |

OTHER PUBLICATIONS

"Sonic Sand Detector," Oceanography International Corp., (Brochure), Oct. 1974.
"Echometer Fluid Level Instrument," Echometer Co. (Brochure), no date.
"Echo Graph," Electroacoustic GmbH, no date, (Brochure).
"Mud Bug," Frazier Resources, Inc., 1977, (Brochure).

Primary Examiner—Richard A. Farley
Attorney, Agent, or Firm—Murray Robinson; Ned L. Conley; David A. Rose

[57] ABSTRACT

The level of mud in the mud return line of a rotary drilling rig is determined by cutting a hole in the top of the line and securing over the hole the saddle shaped base flange of a heat insulated sound tube supporting the ultra sonic transducer of an air coupled sonar distance measuring apparatus. The apparatus continuously digitally displays the average mud level. Upon a first manual command the apparatus makes a printed record of the level, time, and date.

The apparatus give an alarm signal whenever the time averaged level departs a predetermined amount from a previously set datum level. When a second manual command is exercised the alarm is discontinued and a record of level is made and the datum level is reset to the existing level. The departure measuring means is reactivated to give an alarm signal upon sufficient departure of mud level from the new datum level.

A third manual command makes a record and turns off the recorder while a trip is being made and until the third command controller is reset.

22 Claims, 5 Drawing Figures

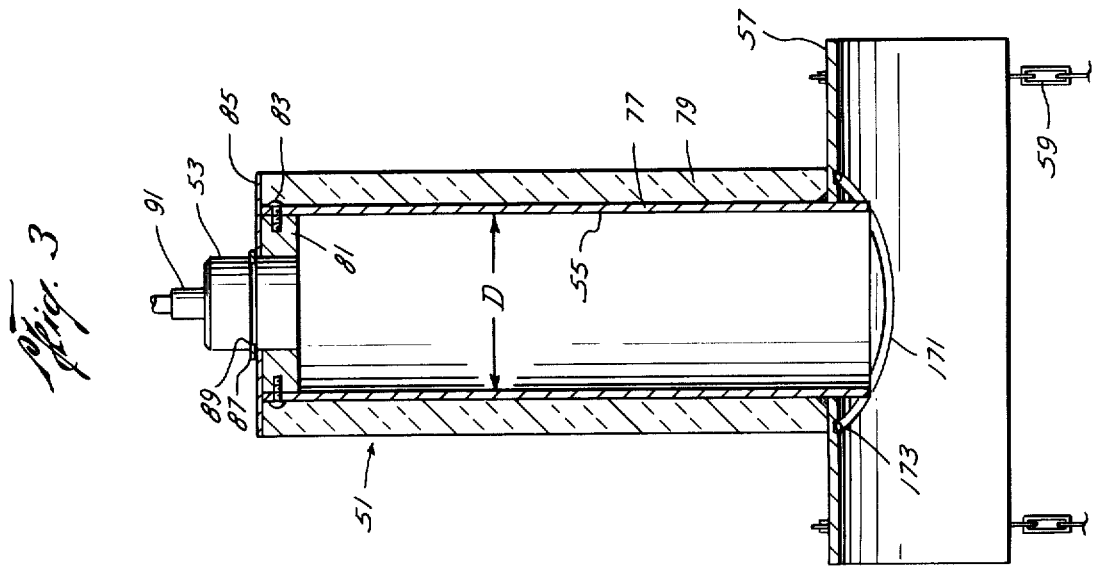
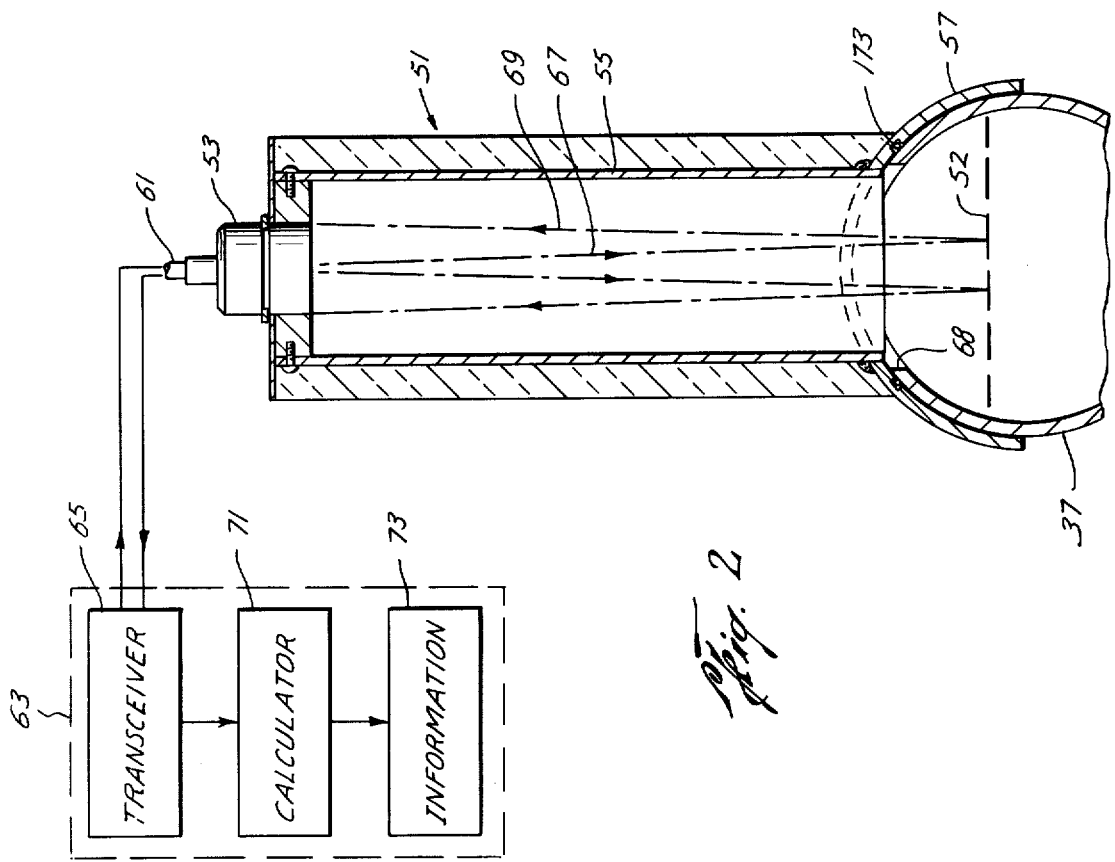

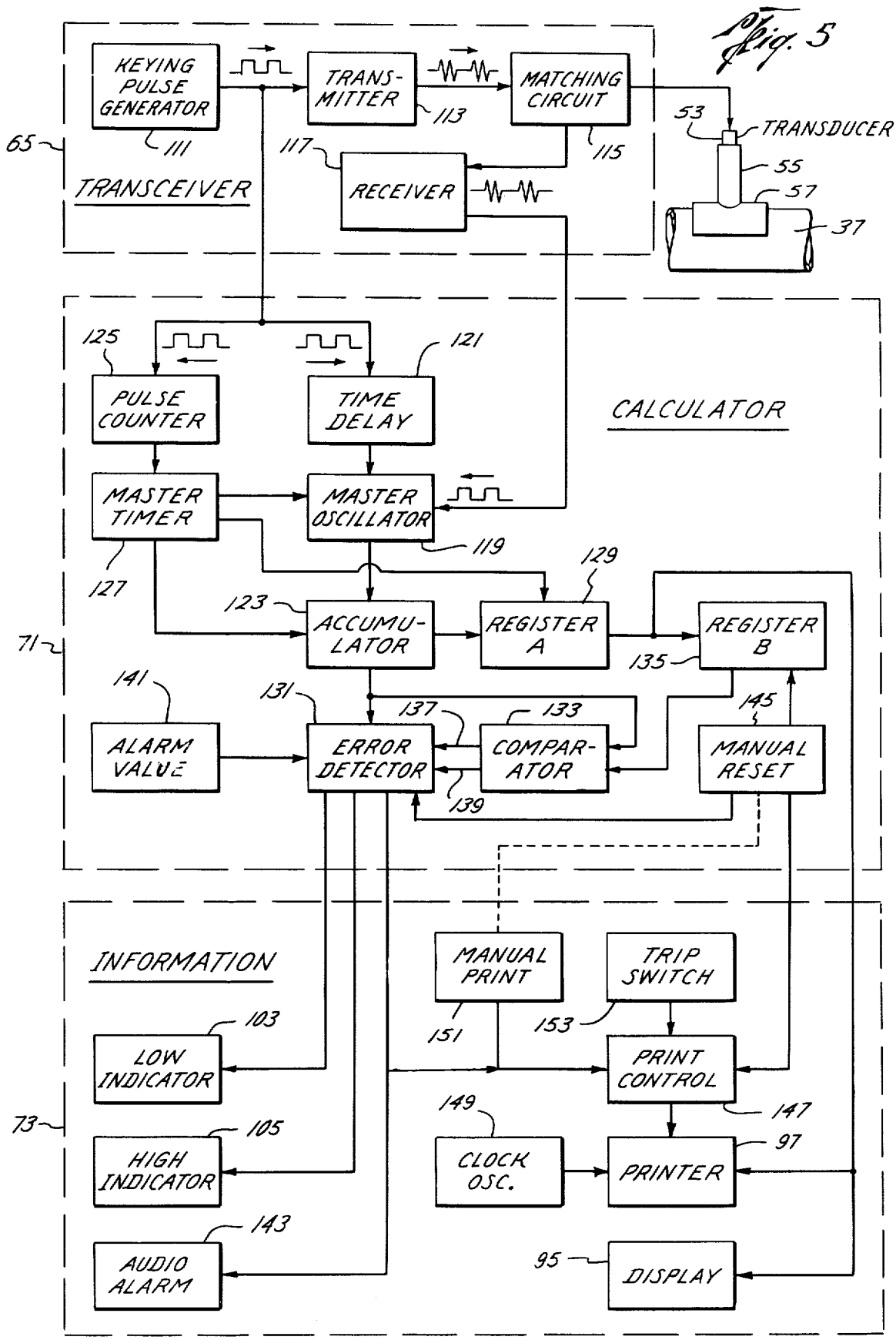

MUD LEVEL MONITOR

BACKGROUND OF THE INVENTION (a) Field of the Invention

This invention relates to well drilling by the rotary method, and more particularly to ultrasonic monitoring of mud level in the drilling mud return line.

(b) Description of the Prior Art

The use of sound to determine the level of liquid in a tank is disclosed by U.S. Pat. Nos.

2,943,296—Fryklund (filed 1955)
3,184,969—Bolton (filed 1963)
4,000,650—Snyder (filed 1975)

The use of sound to determine the level of liquid in a well is disclosed by U.S. Pat. Nos.

2,914,686—Clements et al (filed 1953)
2,927,301—Booth et al (filed 1954) 3,100,023—Clements (filed 1959)

An apparatus combining a return mud flowline transducer, a mud pit level transducer and pump pressure transducer is disclosed in U.S. Pat. No.

3,726,136—McKean et al (filed 1970)

The flowline transducer is actuated by a paddle on the flowline; the pit level transducer is actuated by a float.

The use of piezoelectric transducers strapped to mud inlet and return lines as vibration detectors for early warning of blowouts is disclosed in U.S. Pat. No.

3,821,726—Chang (filed 1972)

In a preprint of paper number SPE 6023 of the Society of Petroleum Engineers of the American Institute of Mining Metallurgical and Petroleum Engineers entitled "Selection and Sensitivity Requirements for Blowout Control Detection Instruments" by Albert K. Dittmer and F. J. Fisher, copyright 1976 it is said:

"In blowout control and prevention planning, the prime detection instrument needs to be designed and its minimum sensitivity specified. * Through use of a computer program * comparisons are made of detection instrument alternatives."

***

"Two types of instruments are generally considered for formation fluid detection and measurement—mud flowline sensors and mud pit level recorders. Stand pipe pressure is occassionally also considered.

"Mud flowline sensors have the potential to measure the rate of flow directly and instantaneously. If mud circulating rate were constant and there were no disrupting factors, any difference in flow rate could be atrributed to formation fluid inflow and its expansion. By using a zero resettable gauge, the difference could be read directly.

"Mud pit level recorders measure cumulative fluid additions over a period of time. It is therefore inherently a less sensitive detector of change."

****

"The flowmeter can be adversely affected by drilled gas breaking out of the mud, changes in the pump output (if a mud pump stroke compensated model is not used), caking up of the sensing paddles and a flow line inclined at a poor angle.

"The pit level recorder can be adversely affected by the hole breathing on connections, the cumulative net effect of filtrate losses, seeping lost circulation, cuttings and shaker losses and gains from entrained gas or air. Make up additions must be corrected for. Floaters present special problems for both flowmeters and pit level recorders.

****

"Flowmeters have the potential to give the earliest significant indications of formation fluid inflow * "Pit level recorders serve as a check on flowmeters and as a back-up detection instrument. *

The general subject of ultrasonics is treated in a publication entitled "basic ultrasonics" by Cyrus Glickstein, published by John F. Rider Puboisher, Inc. New York, copyright 1960. There disclosed at page 62 is the block diagram of a typical echo ranging unit. The diagram is as follows:

| Transmitter | ---> | Trans- | ------- | transmitted signals |
|---|---|---|---|---|
| . | | ducer | <------ | echoes |
| . | | . | | |
| . | | . | | |
| . | | . | | |
| Synchronizing | ---> | Receiver | | |
| Circuit | ---• | . | | |
| . | . | . | | |
| . | . | . | | |
| . | . | . | | |
| . | . | . | | |
| Marker | •--> | Indicating | | |
| Circuit | ------> | Unit | | |

As there described:

"Echo ranging requires transmitting pulses and receiving echoes. Transmission requires a generator (transmitter) and transducer. To receive the echo, the transducer is used with an entirely separate unit—a receiver. * The echo ranging receiver processes and delivers the received signal to an indicating unit which displays the echo visually. Therefore, an indicating unit is required. To synchronize properly the action of transmitter, receiver and indicating unit, additional synchronizing circuits are required. * The distance can be indicated rather precisely with accurately calibrated range markers." At page 73, the Rider publication gives a block diagram for a typical sonar set as follows:

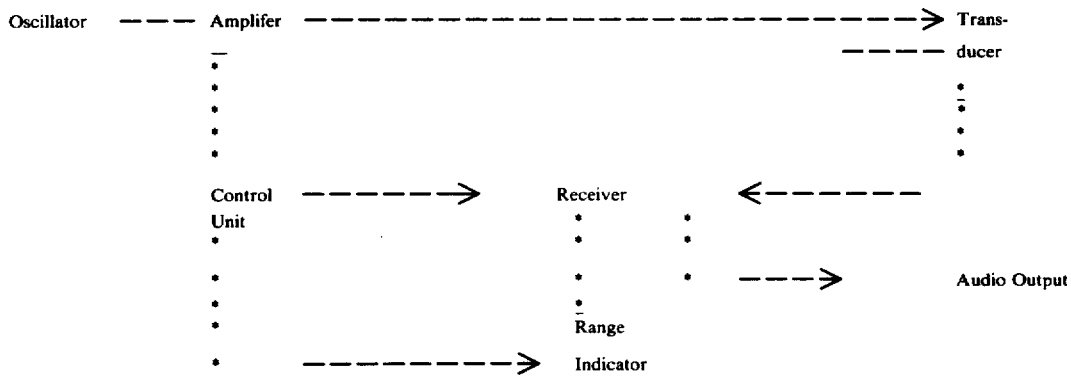

It is there said that:

"The transmitter of a typical sonar set, sometimes called the driver, consists of an oscillator and amplifier. The oscillator generates a frequency for short intervals (in pulses) several times per minute. By an appropriate front-panel setting, the operating range is selected. This automatically sets the pulse repetition rate. The grater the range, the lower the pulse repetition rate must be. Fewer pulses per minute will be generated as the range is increased, since sufficient time must be allowed for the pulse of energy to travel to the maximum range and return before the next pulse is generated. * * * The resulting pulses of r-f energy are amplified in the amplifier stage to the proper power level and applied to the projector (transducer).

At page 65 the Rider publication states:

"Echo ranging receivers follow the general pattern of all electronic receivers."

A block diagram for such a receiver is then given as follows:

"Recorders may be used instead of, or in addition to, CRT's or other indicating devices in echo-ranging equipment." * * *

"A typical recorder has a stylus which moves vertically. A * * * roll of graph paper slowly passes under the stylus * * * The stylus is pulled down the length of the paper each time the transmitter emits a pulse."

Continuing on page 66 it is said:

"Other common indicating devices used in echo-ranging equipment are: (a) indicating lights; (b) alarms; (c) indicating meters.

At page 117, with reference to an ultra sonic continuous-level gage it is said:

"A continuous-level gage monitors liquid level continuously at all levels * * * Ultrasonic continuous level gages are echo-ranging devices. One device utilizes a probe inserted into the monitored tank and a combination control-indicating unit installed remotely. Liquid level in the tank is measured by measuring the time taken by ultra sonic pulses of acoustic energy to travel

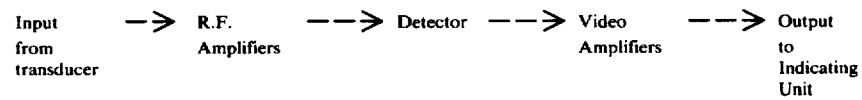

It is stated that

"The block diagram shows a typical echo-ranging receiver which receives a signal, amplifies it, detects and amplifies it further, than applies the signal to a cathode-ray tube indicator"

At page 65 the Rider publication continues:

down the probes to the liquid surface where they are reflected back in the control unit. The longer it takes to make the complete trip, the lower the liquid level. A meter or counter indicates the level."

A block diagram on the same page shows the gage as follows:

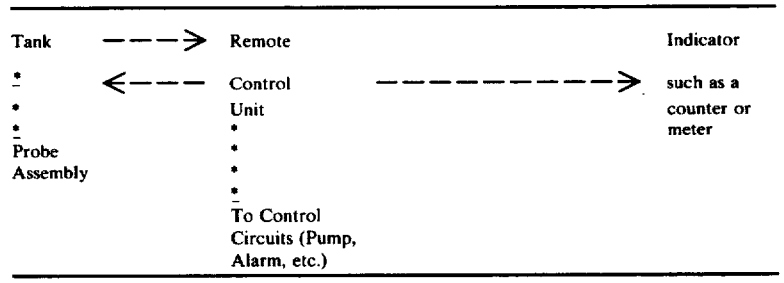

The probe assembly in the tank is shown to include a pair of sensing rods surrounded by a guard tube, the sound travelling down inside the tube to the liquid surface and reflecting back up the tube.

In addition to echo ranging, the Rider publication described other uses of ultra sonic techniques. At page 127 it is stated:

"Flow rates in liquids can be measured ultra sonically Two small transducers are installed in a pipe some distance from each other. Each acts alternately as a transmitter and a receiver for ultra sonic pulses. Pulse transmission is first in the direction of flow, then against flow direction. First the velocities of sound transmission and flow add, then the flow velocity is subtracted from other sound velocity. The two resultant velocities are measured electronically and converted to a flow rate which is displayed on a meter."

Despite the fact that echo ranging is so well known, it will be noted that in none of the foregoing literature is an echo ranger disclosed that is used to determine the level of flowing liquid in a horizontally extending pipe, especially a mud return line in a well drilling apparatus. When it has been desired to check the mud in the mud return line, either a paddle has been placed in the line to respond to flow or a transducer has been placed around the line to respond to vibration.

A problem exists with the employment of sound echo distance measurement as applied to monitoring liquid level in a mud return line due to the small size of the pipe and the short distances to be measured. This is in contrast to the situation existing in grain elevators and in wells.

Sound travels at a speed of around 1100 feet per second in air. That means that for sound to traverse half the diameter of a one foot diameter pipe to strike the mud-air interface and return to the top of the pipe, a distance of one foot, takes only about one millisecond. However, many transducers will continue to oscillate for over a millisecond after termination of the applied electrical stimulus. Therefore, the transducer must be positioned above the level of the top of the pipe a distance sufficient to create a travel time for the echo long enough for the transducer to stop oscillating before the echo is received.

On the other hand, the farther away the transducer is located, the weaker the echo received, which may necessitate the use of a sound gathering dish and extra electronic amplification.

It may also be noted that change in mud level of the order of one percent (about ⅛ inch) causes a change in sound travel time of two percent or only 20 microseconds. That is the same order of magnitude as the length of one cycle of sound at 50 kilohertz. According to the Rider publication, page 77, the typical sound frequency range for a fathometer is 16–50 kilohertz.

Another problem in echo ranging as applied to drilling mud level measurement is the presence of cuttings or other detritus in the drilling fluid. The resultant lumps may cause spurious indications of mud level.

Another difficulty to be overcome if echo ranging is to be applied to liquid measurement in a mud return line is protection of the equipment from the mud itself. A transducer placed inside the pipe at the top side will periodically be covered with mud or detritus. The speed of sound in solids differs from that in air so that spurious results would be obtained.

SUMMARY OF THE INVENTION

According to the invention, the level of liquid in the drilling fluid return line of a rotary drilling apparatus is monitored by setting the line to discharge to a lower fluid level, preferably through the atmosphere, cutting an open window in the top of the line, mounting an electrosonic narrow beam low Q transducer above the window, shielding the path of sound between the window and transducer against extraneous air movement and thermal conduction, periodically transmitting bursts of high frequency ultrasonic sound from the transducer through the shielding and window to reflect off the liquid in the line back up through the window and shielding and receiving it at the transducer, measuring the transit time for transmission through the window to the fluid interface and back to the window, averaging the measurements for a number (e.g. ten) of transits and indicating the result, e.g. by a digital display, a digital print out upon manual command, an audible alarm and print-out upon departure from a preset value, and a visual indication of direction of departure.

The provision of a window in the return line enables the transducer to be placed to one side of the line at a sufficient distance from the drilling fluid surface to prevent it from becoming covered with mud and detritus.

The provision of shielding prevents spurious results that might occur due to stray noise, wind, rain, dust, and temperature change in the outside air. The drilling fluid itself will be warmed in its transit through the well bore and will achieve a fairly constant temperature which will be imparted to the shielded air column between the transducer and the window.

The averaging of the transit times for ten transits makes the apparatus unresponsive to changes in apparent level due to mud balls and ripples.

The use of high frequency sound, enables the transducer dimensions to exceed the wavelength of the sound by a large factor to enable a highly directional beam to be obtained. For example, at the preferred frequency of 40 kilohertz the wave length in air is about 0.02 inch. This compares with the diameter of the window and tubular shielding or sound tube of 5 inches and a transducer having a smaller diameter of 2¾ inches in a preferred embodiment. A beam having a cone angle of 7 degrees is used.

Employing a beam of narrow cone angle maintains the beam intensity over a long distance so that the same transducer can be used for transmission and reception without the necessity of employing a sound focusing disc above the transducer to pick up the echo. For example, with a sound tube length of about fourteen inches, as is preferred, disposed over a window in the top of a ten inch diameter drilling fluid return line, the travel path from transducer to the bottom of an empty line and back is four feet. In that distance the beam would spread out radially only ¼ foot or three inches.

The employment of a transducer of low Q enables the transducer to be placed close to the top of the mud line inner diameter without having the echo interfered with by continuance of the initial oscillation of the transducer resulting from the electronic stimulation applied thereto. In this respect it may be added that the burst of high frequency alternating current applied to the transducer is shortened to advance the initiation of the oscillator decay.

BRIEF DESCRIPTION OF THE DRAWINGS:

For a detailed description of a preferred embodiment of the invention reference will now be made to the accompanying drawings wherein FIG. 2 is a schematic pictorial view of a drilling fluid return line with liquid level monitoring according to the invention;

FIG. 3 is an isometric view, partly in section of a probe in accordance with the invention;

FIG. 5 is a block diagram of apparatus according to the invention.

The drawings are not to scale, except for FIG. 3, wherein for reference the dimension D is 4⅞ inches. The Patent Office conventions for showing materials in elevation and section have been employed, from which it will be seen that all parts are made of rigid metal, e.g. steel, except as otherwise noted hereinafter. The electric conductors are made of copper or other similar metallic conductor. The calculator elements are semiconductors and other conventional materials. The transducer is a titanate crystal.

DESCRIPTION OF PREFERRED EMBODIMENT

Figure 1:
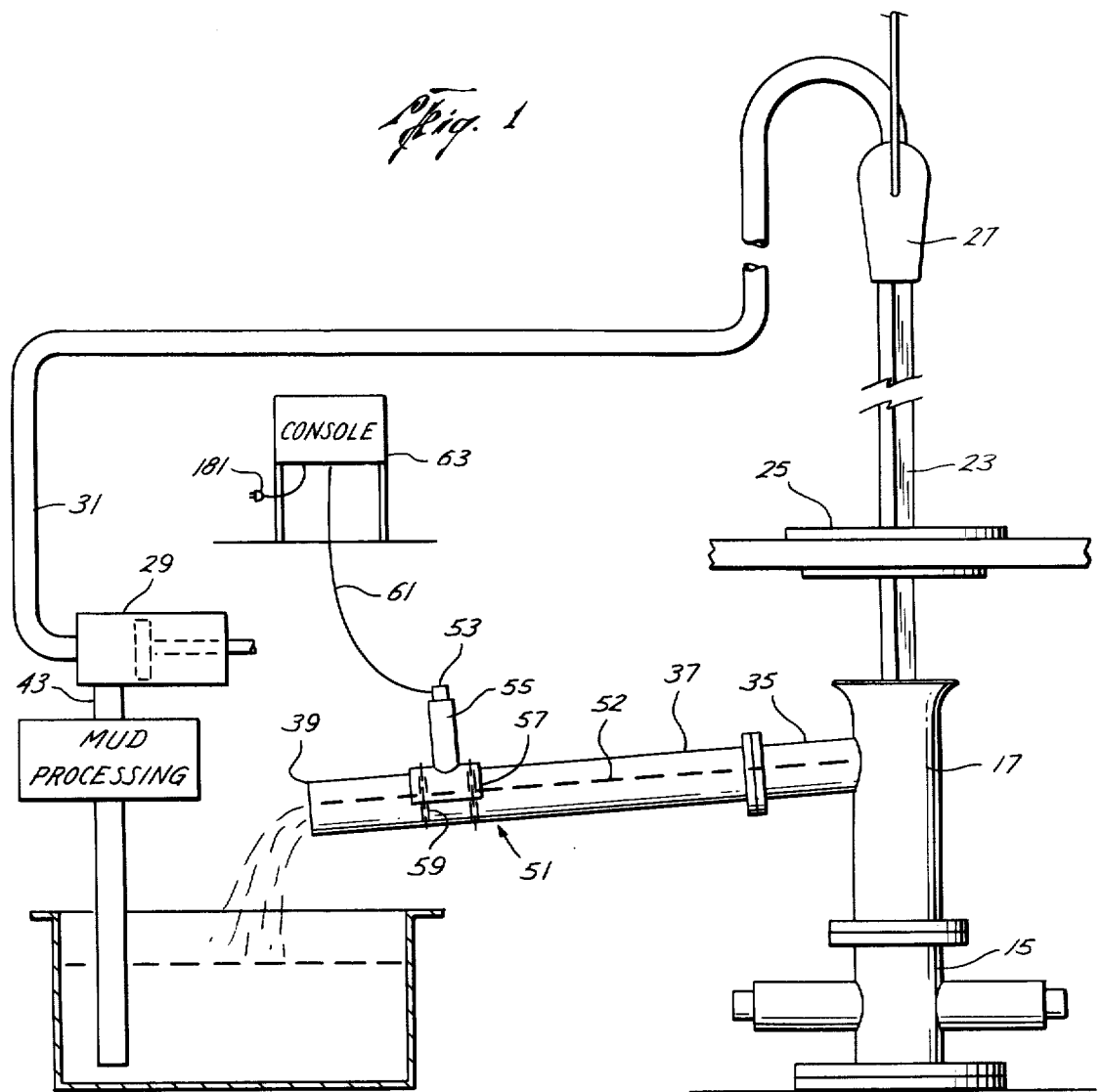
FIG. 1 is a schematic pictorial view of rotary drilling equipment incorporating apparatus according to the invention.

Referring now to FIG. 1 there is shown a well bore 11 at the top of which is surface casing 13, blowout preventer 15 and bell joint or tee 17. A drill bit 19 in the bottom of the well bore is connected to a string of drill pipe 21 which extends to the top of the well bore where it is connected to a kelly 23. The kelly is rotated by rotary table 25. The kelly is suspended by a swivel 27 which in turn is supported by the hook of a derrick (not shown).

Drilling fluid i.e. a liquid such as mud, is delivered from a slush pump 29 to a hose 31 connecting to the stationary inlet of swivel 27. The drilling mud flows down the kelly and drill pipe to the drill bit and then out of the bit and back up the annulus 33. The mud flows up the annulus to bell joint 17 and out lateral branch 35 of the bell joint. The mud then flows down mud return line 37 and flows out open end 39 of the pipe into a mud tank 41. After suitable processing by equipment (not shown) e.g. by passage through a shale shaker, treatment tanks, and a settling basin or mud pit, the mud is picked up by the slush pump suction line 43.

Installed over an open window in the top of the mud return line is level sensor 51 which is reponsive to the level of mudair interface 52. The sensor includes a transducer 53, a sound tube 55, and a saddle mount 57 which is secured in place on line 37 by chains 59. A dual conductor electric cable 61 connects the transducer element of the mud level sensor to console 63 which houses transceiver, calculator, and information elements.

Referring now to FIG. 2, the operation is as follows: Transceiver 65 generates bursts of 40 kilohertz alternating current at a burst rate of 30 hertz. A burst is conducted by cable 61 to transducer 53 which generates an ultra sonic burst at 40 kilohertz. The ultra sonic burst beams down as indicated at 67 with a cone angle of seven degrees. The ultra sonic burst passes through window 68 in mud return line 37.

The beam spread where the beam passes through the window can easily be calculated from the geometry of the apparatus:

$$+\tan(X/2)=(r)/l$$

where (x) is the cone angle, (r) is the increase in the beam radius and (l) is the length of the path of travel. With a seven degree cone angle the beam spread in fourteen inches is only $$r-(14)(0.0611)=0.865 \text{ inches}$$

Therefore even with sound emitted from the whole face of the 2¾ inch diameter transducer, the beam width would be only 2.75 plus (2) (0.865) equals 4.48 inches. This is less than the 5 inch diameter of window 68.

The sonic burst reflects from the air-mud interface 52 back up to transducer 53. The reflected acoustic beam is indicated at 69. On receipt of the first wave front of the reflected burst the transducer generates a 40 kilohertz alternating current burst and sends it via cable 61 to transceiver 65. Calculator 71 processes data from the transceiver and sends it to information element or means 73 which provides mud level information.

Referring now to FIG. 3, there is shown more detail of the mud level sensor 51. As there shown, sound tube 55 includes an inner tube made of steel welded at its lower end to saddle shaped mounting plate 77 around which is disposed a tube 79 of thermal insulation such as a sponge synthetic rubber. A metal disc 81, which may be aluminum, is adjustably secured to the top of steel tube 77 by set screws 83. A steel plate 85 rests on the top edge of sound tube 55 and disc 81. Transducer 53 extends through a hole in the center of plate 85 and disc 81 and is supported by a locking collar 87 disposed in a groove 89 around the transducer. The distance from the bottom of the transducer to the top of the inner diameter of the pipe is fourteen inches. This distance depends on the Q of the particular transducer and the length of the electrical burst applied by the transmitter.

A two prong electrical connector 91 at the top of the transducer is adapted to connect with a correlative connector box 93 (FIG. 4) on the end of cable 61.

Figure 4:
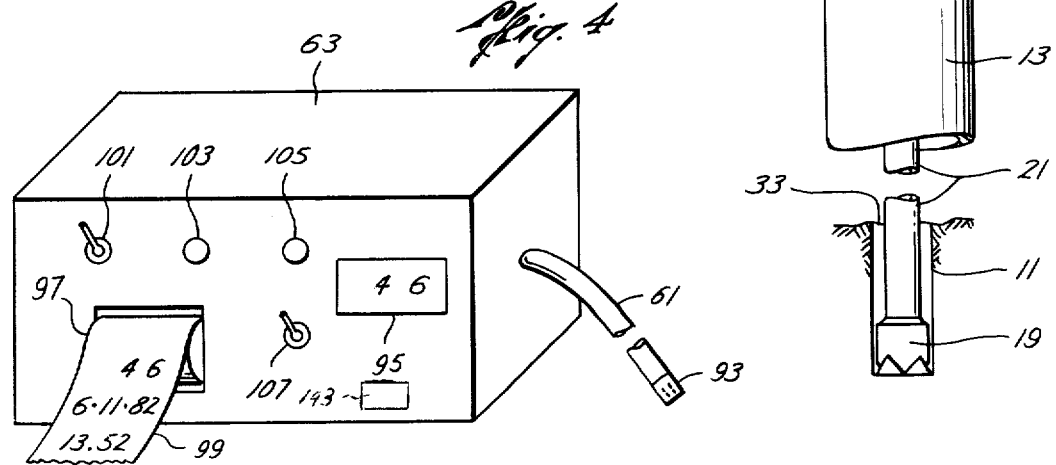
FIG. 4 is a pictorial view of a console housing transceiver, calculator and information elements according to the invention.

In FIG. 4 there is shown the exterior of console 63 which houses the transceiver, calculator and information means. On the exterior of the console is digital display 95 which indicates the current mud level. A seven segment LED is employed for the display. A recorder 97 includes a roll of paper 99 and means (not shown) to print on the paper in numbers the current mud level and time of day and date and drive the paper roll forward to provide space for the next print out. Movement of switch lever 101 to the left closes a switch to actuate the printer to print the current mud level.

Also on the face of the console are indicator lights 103, 105 which light up and audible alarm 143 which sounds, when the mud level goes up, or down, respectively, over a preset amount. At such time, the operator can throw the handle of switch actuator 101 in the opposite direction and close a switch which both causes a print out and resets the datum level for the apparatus to correspond to the current mud level.

A further switch actuator 107 controls a switch which when open shuts down the printer, e.g. when it is desired to make a trip, i.e. remove the drill pipe from the well bore to change the bit or for other purpose.

Referring now to FIG. 5 there is shown further detail of the transceiver means 65, calculator means 71 and information means 73 housed by console 63. The transceiver includes a keying pulse generator 111 producting pulses at 30 Hz. which activates transmitter oscillator 113 thirty times a second to transmit a burst of 40 kilo Hz. alternating current. The 40 kilo Hz. electric current is connected through matching circuit 115 to transducer 53 which in turn produces bursts of 40 kilohertz ultrasound at thirty bursts per second.

Transducer 53 is preferably a titanate crystal 2 inches in diameter by 2¼ inches high and includes a matching transformer having 590 turns of primary and 125 turns of secondary with an inductance of 44 millihenrys.

Ultra sound 40 K.Hz. bursts reflected back to transducer 53 are converted back to 40 k.hz. alternating electric current bursts which are connected by matching circuit 115 to receiver 117. Receiver 117 demodulates the 40 K.hz. ac bursts and produces electric current pulses similar to the keying pulses from generator 111 but retarded in phase by the transit time of the ultra sound burst going from the transducer to the mud-air interface in mud return line 57 and back to the transducer.

Referring now to calculator means 71, master oscillator 119 is started whenever it receives a pulse from the generator 111 via time delay 121 and is stopped whenever it receives a pulse from receiver 119. Time delay 121 is equal to twice the travel time of an ultra sonic pulse from transducer 53 to the mud/air interface in mud return line 57 when the line is full of mud. Therefore the differnce between the times of arrival at master oscillator 119 of pulses from time delay 121 and from receiver 117 equals twice the time of travel of an ultrasonic burst from the top of mud return line 57 to the mud/air interface in such line and the number of oscillations of master oscillator 119 during the period is a measure of the distance of the mud/air interface from the top of the mud return line, that is, the depth of the air in the line. That number of oscillations is passed from oscillator 119 to accumulator 123 whose memory stores the total number of such oscillations it receives counting down from a number equal to the diameter of the pipe, preferably 10 inches. The number thus stored is a measure of the depth of the mud in the line.

Calculator means 71 includes pulse counter 125 which receives pulses directly from keying pulse generator 111. When a preset number of pulses, e.g. ten, has been received by the counter, it sends a pulse to master timer 127. Master timer 127 then sends a control pulse to the master oscillator 119 to shut it down for a time long enough for the following further activities to be completed.

Timer 127 sends a control pulse to accumulator 123 to cause it to transfer its stored number to A register 129. This number is a measure of the average depth of the mud in the mud return line, averaged over ten cycles of keying pulse generator 111, i.e. one-third of a second. A following control pulse from timer 127 causes register 129 to transmit data pulses to display 95 in information means 73, activating the display to show current mud level in percent of pipe diameter.

At the same time the control pulse actuates accumulator 123 to transfer its stored number to the A register, it also causes the stored number to be sent to error detector 131 and to comparator 133. Comparator 127 also receives a number from B register 135, which is the last previously set mud depth measurement, as hereinafter explained. Comparator 133 compares the current mud depth with the set or datum mud depth from register B and sends out a signal on one of two lines 137, 139 according to whether the current depth is greater or lesser than the datum mud depth, or sends no signal if there is no difference.

If error detector 131 receives a signal from comparator 133, it compares such signal with a preset permissible departure signal from alarm value signal generator means 141. If the signal from the comparator equals or exceeds the alarm value, the error detector sends a signal to audio alarm means 143 and to print control means 147 to actuate printer 97 of the information means 173. At the same time the error detector sends a signal to either low indicator light 103 or high indicator light 105 according to whether the comparator signal showed a negative or positive change.

At the time the user hears the audio alarm, or at any other time he so chooses he may move switch actuator 101 (FIG. 4) to activate manual reset means 145. This will send a signal to B register 135 and cause it to store whatever number signal it currently is receiving from the A regis.er. The mud depth datum is thereby changed. At the same time a signal is sent from reset 145 to the error detector to clear the detector and cause the audio alarm and indicator lights to be shut off. Also at the same time, a signal is sent from reset means 145 to print control means 147 to activate printer 97. Printer 97 then prints the current mud depth as signaled from register A and the time and date as signaled from clock oscillator 149.

At any time it is desired to cause the printer to record the mud depth, date and time, switch actuator 101 (FIG. 4) can be moved in the opposite direction to activate manual print means 151 which sends a signal to print control 147.

Whenever it is desired to make a trip or for other reason it is desired to shut down the printing apparatus, switch actuator 107 (FIG. 4) can be thrown to actuate trip switch 153, thereby disenabling print control 147.

The foregoing embodiment of the apparatus of the invention was a preferred embodiment when conceived. It has been built and tested and found to be satisfactory. Applicant has some ideas for further improvements, but these have not yet been built. One idea shown in FIG. 3 is the addition of groove 171 in the saddle mount 51 to receive an O-ring (elastomer) to seal more effectively between the saddle mount and the top of the mud return line. Other ideas are modifications of the calculation and information means to effect different printouts and under different times and circumstances. The trip switch may be separated from the console so it can be separately located.

To employ the apparatus above described, one needs to position the mud return line so its end is above the level of liquid in the path from the line to the mud pits, and preferably to open to the atmosphere rather than discharging into a pipe whose lower end is submerged in a mud tank. Also, it should be horizontal or have only a slight tilt, so that the normal level of mud in the line at the location of the level sensor (transducer, sound tube and saddle mount) will be about half the inner diameter of the pipe. This will leave room for the mud level to fluctuate up and down as the rate of the return mud from the annulus of the well bore varies.

A further point to consider relative to the near horizontal or lateral disposition of the mud return line is the fact that the ultra sound beam is directed perpendicular to the axis of the saddle mount and therefore to the axis of the mud return line. If one assumes that the air/mud interface is substantially horizontal regardless of the tilt of the mud return line, then tilting the line will tilt the ultra sound beam relative to the air/mud interface so that the beam will not be perpendicular to the interface. This will cause the reflected beam to be directed away from the transducer. With a seven degree cone angle for the beam and the parts constructed for reception of the full reflected beam when the interface is perpendicular to the beam, the entire reflected beam would miss the transducer if the mud line tilt exceeded seven degrees. If can therefore be said that the mud return line tilt should not exceed the cone angle of the beam.

Having positioned the mud return line properly, a suitable window is cut in the top of the line. The window should be large enough to pass the incoming and reflected ultra sound beam even when the mud level is substantially zero. The sensor is then positioned centrally over the window with the saddle mount around the top of the line and the saddle mount is chained or in other manner releasably secured in place. If an O-ring seal is used, it will be positioned in the groove of the saddle mount at this time.

After the mud return line has been leveled, a window cut, and the sensor mounted over the window, the console is activated, e.g. by plugging power supply cord 181 (FIG. 1) into an available power supply outlet (not shown). Thereupon ultra sonic bursts are reflected off the mud/air interface, and their travel time measured to determine the depth of the mud. The console apparatus preferably is set to display and print (on command) mud depth to the nearest tenth of an inch and to sound the alarm whenever the level changes by a tenth of an inch and to give an indication of the direction of change by lighting one of the indicator lights. Thereupon the operator commands a printout, turns off the alarm and indicator light, and resets the datum level for continued monitoring.

While preferred embodiments of the method and apparatus of the invention have been shown and described, modifications thereof can be made by one skilled in the art without departing from the spirit of the invention.

I claim:

1. In well drilling according to the rotary method in which liquid base drilling fluid is pumped down the bore of the well being drilled, through the drill bit and back up the well bore to a return line extending laterally from the well bore and thence to a reservoir from which it is again pumped, the method of monitoring the level of drilling fluid in the return line comprising the steps of:
   providing an open window in the top of the return line,
   positioning the windowed portion of the line above the level of the fluid in the path of drilling fluid from said portion to the reservoir,
   mounting an electro-sonic transducer above the window,
   beaming ultra sound from the transducer to the air-drilling fluid interface in the fluid return line,
   measuring the transit time of the beam from the window to the interface and back to the window to give information as to the level of the interface in the line,
   generating timing signals during such transit and counting down an accumulator with said signals during such transit to give information as to height of the air-drilling fluid interface in the return line,
   comparing the count in the accumulator with a preset datum count, and
   giving an alarm when the accumulator count departs from the datum count by a predetermined amount,
   recording the accumulator count,
   turning off the alarm, and
   resetting the datum count equal to said accumulator count.

2. Method according to claim 1 including:
   counting down the accumulator during a plurality of such transits to average said height.

3. Method according to claim 1 including:
   starting the countdown a predetermined time after the burst leaves the transducer equal to twice the transit time from the transducer to the window, and
   stopping the countdown upon receipt by the transducer of the reflected pulse.

4. Method according to claim 1 including:
   determining the direction of such departure, and
   giving an indication of such direction simultaneously with the alarm.

5. In apparatus for well drilling according to the rotary method in which liquid base drilling fluid is pumped down the bore of the well being drilled, through the drill bit and back up the well bore, apparatus for monitoring the level of drilling fluid in the return line comprising:
   an open window in the top of the return line,
   said line being positioned with the windowed portion above the level of the fluid in the path of drilling fluid from said floor to the reservoir,
   an ultrasonic transducer mounted above the window,
   means for activating said transducer to send a beam of ultrasound from the transducer to the air-drilling fluid interface in the fluid return line,
   means to measure the transit time of the beam from the window to the interface and back to the window to give information as to the level of the interface in the line,
   means to generate timing signals during such transit,
   countdown accumulator means connected to the last said means to countdown with said signals during such transit to give information as to the height of the air-drilling fluid interface in the return line,
   means to compare the count in the accumulator with a predetermined count,
   means to give an alarm when the accumulator count departs from the datum count by a predetermined amount, and
   means to record the accumulator count and turn off the alarm and reset the datum count equal to the accumulator count.

6. Apparatus according to claim 5,
   there being an air space above the normal level of drilling fluid in the return line.

7. Apparatus according to claim 5,
   said return line being level to within X degrees of horizontal where X is the cone angle of the ultra sonic beam.

8. Apparatus according to claim 5, including
   means shielding the path of sound between the window and transducer against air currents.

9. Apparatus according to claim 5 including:

means insulating the path of sound between the window and transducer against thermal conduction and convection.

10. Apparatus according to claim 5,
said return line discharging to the atmosphere above the level of drilling fluid in a receptacle.

11. Apparatus according to claim 5 including:
means to cause said accumulator means to count down during a plurality of such transits to average said height.

12. Apparatus according to claim 5 including:
means to start the count down a predetermined time after the burst leaves the transducer equal to twice the transit time from the transducer to the window, and
means to stop the count down upon receipt by the transducer of the reflected burst.

13. Apparatus according to claim 5 including:
means to determine the direction of such departure, and
means to give an indication of such direction simultaneously with the alarm.

14. For use in well drilling according to the rotary method in which liquid base drilling fluid is pumped down the bore of the well being drilled, through the drill bit and back up the well bore to a return line extending laterally from the well bore and thence to a reservoir from which it again pumped, mud level sensing apparatus comprising:
a sound tube, open at one end,
an electro-acoustic ultra-sonic transducer mounted at the other end of the tube and positioned to beam ultra-sound inside the tube toward the open end of the tube, and
a saddle mounting secured to said open end of the tube and having an opening in register with the open end of the tube and adapted to be secured over such return line over a window therein.

15. Apparatus according to claim 14,
said sound tube and saddle mounting including heat conducting metal positioned to transfer heat from such return line to air in the tube, the metal of the mounting and tube being connected in heat conducting relationship.

16. Apparatus according to claim 15
said tube including a layer of thermal insulation to retard heat transfer between air in the tube and air outside the tube,
the wall of said tube being imperforate to confine the air therein.

17. Apparatus according to claim 14,
the sound tube being generally cylindrical, and
the saddle mounting being cylindercally curved with a radius greater than the radius of the sound tube.

18. Apparatus according to claim 14
said saddle mounting having a groove therein on its opposite side from the side at which the transducer is located, and
a seal ring in said groove adapted to seal with such return line.

19. In well drilling according to the rotary method in which drilling mud is pumped down the bore of the well being drilled, through the drill bit and back up the well bore to a return line extending laterally from the well bore and thence to a reservoir from which it is again pumped, the method of monitoring the drilling mud comprising:

with the return line leveled to within X degrees of horizontal, where X is the cone angle of a beam produced by a sonar transducer, flowing the drilling mud in the return line at a normal rate sufficient to leave an air space above the level of the drilling mud in the return line, and
measuring the level of drilling mud in the return line by sonar employing said transducer placed out of the path of mud flow in said return line, above and directed through a window in the top of the return line, at a height low enough for the beam reflected from the air-mud interface when at lowest level to pass through the window, and high enough to allow the transducer's natural oscillation following a transmission burst to die out before reception of the burst reflection from the air-mud interface when at highest level,
the path of travel, between said transducer and said window, of acoustic bursts emitted by the transducer during said measuring, being shielded from the air outside the return line without reflecting the beam as the burst travels from transducer to window not impeding the flow of mud through said return line,
whereby mud flowing in said return line will tend to equilibrate the air temperature in said path without escape of drilling mud or interference with such measuring.

20. Level sensing apparatus comprising:
an imperforate shield tube, narrower than it is long and open at one end,
an electro-acoustic ultra-sonic transducer mounted at the other end of the tube and positioned to beam ultra sound inside the tube toward the open end of the tube,
said apparatus being useful for sensing the mud level in the return line in a well drilling system employing the rotary method in which mud is pumped down the bore of a well being drilled, through the drill bit and back up the well bore to a return line extending laterally from the well bore and thence to a reservoir from which it is again pumped,
said apparatus being characterized by:
(1) said open end of the tube being adapted to be secured to such return line in fluid tight communication with a window therein,
(2) said transducer producing a beam directed toward said open end of the tube, which beam is narrower than said open end, avoiding reflections of said beam from the sides of the tube as it travels from said transducer inside said tube and out said open end,
(3) said transducer having a radius less than the radius of the open end of said tube by a distance R, and
(4) said transducer producing a beam having a cone angle x where (1) tan (x/2) is less than R, (1) being the length of the tube from the transducer to the open end of the tube.

21. Apparatus according to claim 20,
said beam having a cone angle of the order of seven degrees and the length of said tube being of the order of fourteen inches and said transducer producing ultrasound of a frequency of the order of forty kilohertz.

22. Apparatus for monitoring drilling mud employed in well drilling by the rotary system, said apparatus comprising:

a sonar transducer for producing and acoustic beam,
a lateral mud return line,
said line being positioned within X degrees of horizontal where X is the cone angle of the beam of said sonar transducer,
said line having an open window in the upper side thereof, and
an air filled tube extending transversely of the line with one end of the tube in open communication with the line through the window,
the axis of said tube being perpendicular to the line axis,
said transducer being positioned in the other end of said tube to direct its beam through said window without the beam reflecting from the sides of the tube,
the width of said beam where it passes through the open end of said tube being narrower than said open end of said tube.

* * * * *